US007216363B2

(12) United States Patent
Serkowski et al.

(10) Patent No.: US 7,216,363 B2
(45) Date of Patent: May 8, 2007

(54) LICENSING DUPLICATED SYSTEMS

(75) Inventors: Robert J. Serkowski, Broomfield, CO (US); William T. Walker, Evergreen, CO (US)

(73) Assignee: Avaya Technology Corp., Basking Ridge, NJ (US)

( * ) Notice: Subject to any disclaimer, the term of this patent is extended or adjusted under 35 U.S.C. 154(b) by 778 days.

(21) Appl. No.: 10/231,957

(22) Filed: Aug. 30, 2002

(65) Prior Publication Data

US 2004/0054909 A1   Mar. 18, 2004

(51) Int. Cl.
H04L 9/32   (2006.01)
(52) U.S. Cl. ....................................................... 726/20
(58) Field of Classification Search ................. 726/10, 726/6, 20
See application file for complete search history.

(56) References Cited

U.S. PATENT DOCUMENTS

| | | | |
|---|---|---|---|
| 4,288,659 A | 9/1981 | Atalla | 178/22.08 |
| 4,811,393 A | 3/1989 | Hazard | 380/21 |
| 4,888,800 A | 12/1989 | Marshall et al. | 380/21 |
| 4,937,863 A | 6/1990 | Robert et al. | |
| 5,157,663 A | 10/1992 | Major et al. | |
| 5,179,591 A | 1/1993 | Hardy et al. | 380/21 |
| 5,204,897 A | 4/1993 | Wyman | 380/4 |
| 5,230,020 A | 7/1993 | Hardy et al. | 380/21 |
| 5,307,481 A | 4/1994 | Shimazaki et al. | |
| 5,341,427 A | 8/1994 | Hardy et al. | 380/21 |
| 5,386,369 A | 1/1995 | Christiano | |
| 5,390,297 A * | 2/1995 | Barber et al. | 726/29 |
| 5,408,649 A | 4/1995 | Beshears et al. | |
| 5,671,412 A | 9/1997 | Christiano | |
| 5,699,431 A | 12/1997 | Van Oorschot et al. | 380/30 |
| 5,708,709 A | 1/1998 | Rose | 705/59 |
| 5,717,604 A | 2/1998 | Wiggins | 709/229 |

(Continued)

FOREIGN PATENT DOCUMENTS

EP   1071253 A1 *   1/2001

OTHER PUBLICATIONS

U.S. Appl. No. 09/357,679, Serkowski.

(Continued)

Primary Examiner—Gilberto Barrón, Jr.
Assistant Examiner—Andrew L. Nalven
(74) Attorney, Agent, or Firm—Sheridan Ross P.C.

(57) ABSTRACT

The present invention is directed to a system, comprising: (i) first and second computational components 102a and b having, respectively, first and second unique identifiers; (ii) a license file 112 comprising third and fourth identifiers 212a and b respectively associated with the first and second computational components; (iii) a license manager 113 operable to (a) obtain, from the first and second computational components, the first and second unique identifiers, (b) access the license file to obtain the third and fourth identifiers, (c) compare each of the first and second unique identifiers with one or both of the third and fourth identifiers; and (iv) a mode setting agent 124 operable to permit the one or both of the first and second computational components to perform an operation, when both the first and second identifiers match one of the third and fourth identifiers, and not permit the first and second computational components to perform the operation, when only one of the first and second identifiers matches one of the third and fourth identifiers.

41 Claims, 5 Drawing Sheets

U.S. PATENT DOCUMENTS

| | | | |
|---|---|---|---|
| 5,745,576 A | 4/1998 | Abraham et al. | 380/25 |
| 5,745,879 A * | 4/1998 | Wyman | 705/1 |
| 5,758,068 A | 5/1998 | Brandt et al. | 726/27 |
| 5,758,069 A | 5/1998 | Olsen | |
| 5,790,074 A | 8/1998 | Rangedahl et al. | 342/357.13 |
| 5,790,664 A | 8/1998 | Coley et al. | 380/4 |
| 5,905,860 A | 5/1999 | Olsen et al. | |
| 5,940,504 A | 8/1999 | Griswold | 705/59 |
| 5,960,085 A | 9/1999 | de la Huerga | |
| 5,978,565 A | 11/1999 | Ohran et al. | |
| 6,011,973 A | 1/2000 | Valentine et al. | 455/456.6 |
| 6,023,766 A * | 2/2000 | Yamamura | 726/29 |
| 6,067,621 A | 5/2000 | Yu et al. | |
| 6,108,703 A | 8/2000 | Leighton et al. | 709/226 |
| 6,148,415 A | 11/2000 | Kobayashi et al. | |
| 6,502,079 B1 | 12/2002 | Ball et al. | 705/59 |
| 6,574,612 B1 | 6/2003 | Baratti et al. | |
| 6,584,454 B1 | 6/2003 | Hummel et al. | |
| 6,765,492 B2 | 7/2004 | Harris | 340/686.6 |
| 6,775,782 B1 | 8/2004 | Buros et al. | |
| 6,778,820 B2 | 8/2004 | Tendler | 455/414.2 |
| 6,826,606 B2 | 11/2004 | Freeman et al. | 709/223 |
| 6,850,958 B2 | 2/2005 | Wakabayashi | |
| 6,854,010 B1 | 2/2005 | Christian et al. | |
| 6,883,095 B2 | 4/2005 | Sandhu et al. | |
| 6,920,567 B1 | 7/2005 | Doherty et al. | 726/22 |
| 6,928,166 B2 | 8/2005 | Yoshizawa | |
| 6,928,558 B1 | 8/2005 | Allahwerdi et al. | |
| 6,934,848 B1 | 8/2005 | King et al. | |
| 6,976,164 B1 | 12/2005 | King et al. | |
| 2001/0013024 A1 | 8/2001 | Takahashi | |
| 2002/0001302 A1 | 1/2002 | Pickett | 370/352 |
| 2002/0017977 A1 | 2/2002 | Wall | 340/5.28 |
| 2002/0038422 A1 | 3/2002 | Suwamoto et al. | |
| 2002/0083003 A1 | 6/2002 | Halliday | 705/52 |
| 2002/0112186 A1 | 8/2002 | Ford et al. | |
| 2002/0125886 A1 | 9/2002 | Bates et al. | 324/307 |
| 2002/0154777 A1 | 10/2002 | Candelore | 380/258 |
| 2002/0164025 A1 | 11/2002 | Raiz et al. | 380/231 |
| 2002/0174356 A1 | 11/2002 | Padole et al. | 713/200 |
| 2002/0176404 A1 | 11/2002 | Girard | 370/352 |
| 2002/0188656 A1 | 12/2002 | Patton et al. | |
| 2002/0194473 A1 | 12/2002 | Pope et al. | |
| 2003/0005427 A1 | 1/2003 | Herrero | 717/178 |
| 2003/0013411 A1 | 1/2003 | Uchiyama | |
| 2003/0144959 A1 | 7/2003 | Makita | |
| 2004/0073517 A1 | 4/2004 | Zunke et al. | 705/59 |
| 2004/0078339 A1 | 4/2004 | Goringe et al. | 705/59 |
| 2004/0103324 A1 | 5/2004 | Band | |
| 2004/0128551 A1 | 7/2004 | Walker et al. | 713/201 |
| 2004/0162998 A1 | 8/2004 | Tuomi et al. | |
| 2004/0166878 A1 | 8/2004 | Erskine et al. | 455/456.1 |
| 2004/0172367 A1 | 9/2004 | Chavez | 705/59 |
| 2004/0181695 A1 | 9/2004 | Walker | 713/202 |
| 2004/0181696 A1 | 9/2004 | Walker | 713/202 |
| 2004/0199760 A1 | 10/2004 | Mazza | 713/150 |
| 2005/0202830 A1 | 9/2005 | Sudit | 455/456.1 |
| 2005/0246098 A1 | 11/2005 | Bergstrom et al. | 701/213 |

OTHER PUBLICATIONS

U.S. Appl. No. 10/232,507, Serkowski et al.
U.S. Appl. No. 10/232,508, Rhodes et al.
U.S. Appl. No. 10/231,999, Walker et al.
U.S. Appl. No. 10/232,906, Walker et al.
U.S. Appl. No. 10/232,647, Walker et al.
U.S. Appl. No. 10/811,412, Walker.
U.S. Appl. No. 10/947,418, Gilman et al.
U.S. Appl. No. 10/775,498, Gilman et al.
ADTech Engineering, "IP Phone SI-160 User Manual (SCCP releases)," Version 1.2 (2002), pp. 1-20.
Articsoft Limited, "Public Key Infrastructure (PKI) FAQs" (Feb. 2, 2003), available at http://www.articsoft.com/wp_pki_faq.htm, 5 pages.
Arsys, "Public Key Infrastructure," (Feb. 4, 2001), available at http://www.transactiontrust.com/technicaindex.html, 4 pages.
Clarke, Roger, "Centrelink Smart Card Technical Issues Starter Kit Chapter 7" (Apr. 8, 1998) at http://www.anu.edu.au/people/Roger. Clarke/DV/SCTISK.html, pp. 1-3.
Datakey, "Securing a Virtual Private Network with Smart Card Technology" available at www.datakey.com, pp. 1-8.
"Digital Camera Key Management Messages," Draft 1 (Aug. 8, 2002), pp. 1-9.
Discerning the Times Digest and Newsbytes, "Global Control of All Buying and Selling Now Possible," vol. 1, Iss. 1 (Jan. 2000), available at http://www.discerningtoday.org/members/Digest/2000Digest/January.Global%20Control.htm, 2 pages.
Info Merchant Store, "VeriFone 2000, MS/DUKPT/STD Pin Pad, New" (printed Feb. 17, 2007), available at http://www.merchantamerica.com/creditcardterminals/index.php!ba=product_enlarge&product=9632, 1 page.
Griswold, Robert S., "Get Smart: The Coming Revolution of Smart Cards," *Journal of Property Management* (May/Jun. 1997), 5 pages.
Entrust Inc., "Entrust Authority Security Manager," (printed Aug. 13, 2004), available at http://www.entrust.com/authority/manager/index.htm, 23 pages.
Infosec Engineering, "Building a Corporate Public Key Infrastructure" (1999), available at http://www.infoseceng.com/corppki.htm, 20 pages.
LockStream Corporation, "Catalyst DRM Service Platform Architecture," Vers. 1.0 (Nov. 2003), pp. 1-28.
Lockstream Corporation, "Catalyst DRM Service Platform" (printed Aug. 13, 2004), available at http://www.lockstream.com/products_spcm.php, 1 page.
LockStream Corporation, "Lockstream KeyDRM" (printed Aug. 13, 2004), available at http://www.lockstream.com/products_1gm.php, 2 pages.
LockStream Corporation, "Lockstream OMA 1.0 DRM Client" (printed Aug. 13, 2004), available at http://www.lockstream.com/products_sprm.php, 2 pages.
Microsoft Corporation, "Accessing a Smart Card" (Aug. 2002), available at http://msdn.microsoft.com/library/en-us/security/security/accessing_a_smart_card.asp, p. 1.
Microsoft Corporation, "Base Service Providers" (Aug. 2002), available at http://msdn.microsoft.com/library/en-us/security/security/base_service_providers.asp, p. 1.
Microsoft Corporation, "Building an ISO7816-4 APDU Command" (Aug. 2002), available at http://msdn.microsoft.com/library/en-us/security/security/building_an_iso7816_4_apdu_command.asp, pp. 1-2.
Microsoft Corporation, "Introducing Smart Cards to the System" (Aug. 2002), available at http://msdn.microsoft.com/library/en-us/security/security/introducing_smart_cards_to_the_system.asp, p. 1.
Microsoft Corporation, "Primary Service Provider" (Aug. 2002), available at http://msdn.microsoft.com/library/en-us/security/security/primary_service_provider.asp, p. 1.
Microsoft Corporation, "Smart Card Authentication" (Aug. 2002), available at http://msdn.microsoft.com/library/en-us/security/security/smart_card_authentication.asp, pp. 1-2.
Microsoft Corporation, "Smart Card Interfaces" (Aug. 2002), available at http://msdn.microsoft.com/library/en-us/security/security/smart_card_interfaces.asp, p. 1.
Microsoft Corporation, "Smart Card Resource Manager" (Aug. 2002), available at http://msdn.microsoft.com/library/en-us/security/security/smart_card_resource_manager.asp, p. 1.
Microsoft Corporation, "Smart Card User Interface" (Aug. 2002), available at http://msdn.microsoft.com/library/en-us/security/security/smart_card_user_interface.asp, p. 1.
Microsoft Corporation, "Smart Card Service Providers" (Aug. 2002), available at http://msdn.microsoft.com/library/en-us/security/security/smart_card_service_providers.asp, p. 1.

Microsoft Corporation, "Vendor Wrapper Service Provider" (Aug. 2002), available at http://msdn.microsoft.com/library/en-us/security/security/vendor_wrapper_service_provider.asp, pp. 1-2.

MIT Laboratory for Computer Science, "The Cricket Indoor Location System," An NMS Project (printed Jul. 31, 2002), available at http://nms.lcs.mit.edu/projects/cricket/, 5 pages.

Motorola Press Release, "ERG Motorola Alliance Receives Award for Smart Card" (Jun. 6, 2000), available at http://www.motorola.com/LMPS/pressreleases/page888.htm, 3 pages.

NEC Infrontia Corporation Press Release, "Establishment of "SmartCardInfrontia" solutions for 'IC card'," (Mar. 13, 2002), 4 pages.

Novell®, "Certificate Server: Public Key Instrastructure," White Paper (1999), pp. 1-10.

SecurityConfig, Back Up Your Encrypting File System Private Key in Windows 2000 Download (Printed Aug. 13, 2004), available at http://www.securityconfig.com/software/alerts/back_up_your_encrypting_file_system_private_key_in_windows_2000.html, 2 pages.

Smart Card Alliance Industry News, "Cubic Introduces New Mobile Ticketing Machine" (Jul. 3, 2003), available at http://www.smartcardalliance.org/industry_news/industry_news_item.cfm?itemID=852, 2 pages.

Smart Card Alliance Industry News, "Cubic Corp. Introduces New National Security and Homeland Defense" (Sep. 9, 2002), available at http://www.smartcardalliance.org/industry_news/industry_news_item.cfm?itemID=310, 2 pages.

SSH Communications Security Corp., "Enabling Virtual Public Networks with Public Key Infrastructure," White Paper (Jan. 2004), pp. 1-9.

Streetman, Kibbee D. et al., "Public Key Infrastructure: Resources, Requirements and Recommendations," ATI IPT Special Report 00-06 (Apr. 2000), pp. 1-45.

Sun Developer Network, "Smart Card Overview," Sun Microsystems, Inc. (1994-2004), available at http://java.sun.com/products/javacard/smartcards.html, 2 pages.

NetLingo Dictionary of Internet Words, "Smart Card" (1995-0004), available at http://www.netlingo.com/lookup.cfm?term=smart+card, 2 pages.

Rankl, Wolfgang. "Smart Card Handbook," (Jun. 13, 2004), available at http://www.wrankl.de/SCH/SCH.html, 8 pages.

Russinovich, Mark, "Inside Encrypting File System, Part 1," *Windows & .NET Magazine* (Jun. 1999), available at http://www.winntmag.com/Articles/Index.cfm?ArticleID=5387&Key=Internals, 4 pages.

Russinovich, Mark, "Inside Encrypting File System, Part 2," *Windows & .NET Magazine* (Jul. 1999), available at http://www.winntmag.com/Articles/Index.cfm?ArticleID=5592&Key=Internals, 5 pages.

VeriFone Inc., "VeriFone Payment Solutions: Point-of-Sale PINpads" (1997-2004), available at http://www.verifone.com/products/printers_peripherals/html/pinpad_family.html, 1 page.

Whatis.com Target Search™, "PKI" (Jan. 13, 2004), available at http://whatis.techtarget.com/definition/0,289893,sid9_gci214299,00.html, 4 pages.

Datakey, "Securing a Virtual Private Network with Smart Card Technology"; Aug. 1, 2002; available at www.dataket.com; pp. 1-8.

* cited by examiner

LICENSING DUPLICATED SYSTEMS

FIELD OF THE INVENTION

The present invention relates generally to the licensing of computational components and specifically to the licensing of duplicated computational components.

BACKGROUND OF THE INVENTION

To provide high levels of reliability and availability, it is common to provide duplicated or redundant computational components. In the event that one component malfunctions, the other component can be enabled to provide continued processing capabilities. In this manner, the duration of any interruption or malfunction is minimized or eliminated altogether.

The use of duplicated computational components can cause difficulties in providing right-to-use protection and software copy protection. In one licensing approach, a valid license file is required to run a computational component. This approach is discussed in detail in copending U.S. patent application entitled "Securing Feature Activation in a Telecommunication System", Ser. No. 09/357,679, filed Jul. 20, 1999, to Serkowski, which is incorporated herein by this reference.

In such licensing verification systems, the license file contains a serial number that must be present on the hardware that is to execute the licensed software for the license to be valid and the software to be executable. In telecommunication applications, for example, the serial number of the control processor must be in the license file for the control processor to run the licensed software.

The license file also contains a software name and/or version of the licensed telecommunication application and licensed features. The data structures corresponding to the features are of two types. In a type 1 feature, the data structures reflected enablement or disablement of the corresponding feature using a simple on/off state. Examples of features falling into this category include abbreviated dialing enhanced list, audible message waiting, vectoring, answer supervision by call classifier, ATM trunking, agent states, dial by name, DCS call coverage, echo cancellation, multi-frequency signaling, and wideband switching. In a type 2 feature, the data structures include a single numeric value and/or a name kind of entry. Examples of features falling into this category include logged-in agents, offer category, maximum numbers of concurrently registered IP stations, administered IP trunks, ports, and concurrently administered remote office stations/trunks, and call center release.

This licensing scheme is not configured for licensing duplicated systems. In duplicated systems, the same type of computational component, such as a (control) processor or an application specific integrated circuit or ASIC, has a plurality of corresponding serial numbers. To provide the desired reliability and availability of duplicated systems, both the primary and backup computational components must be able to be enabled by the licensing verification system. In telecommunication switching systems for example, the licensing verification system must be able to run on both the primary and backup sides of the duplicated processor hardware. Existing licensing verification systems, however, allow only one serial number to be enabled per license file. When two license files are used to enable independently each of two duplicated computational components, users of the duplicated computational components can use each license file to create unlawfully two simplex systems, each having only one nonduplicated computational component, to process software licensed for only one system. In telecommunication applications, the software for a duplicated system costs considerably less than twice the cost of the software for a simplex system.

SUMMARY OF THE INVENTION

These and other needs are addressed by the various embodiments and configurations of the present invention. The present invention provides a method and system that uses a plurality of unique computational component identifiers and/or a duplication flag to enable selectively a computational system or functional part thereof having two or more duplicated computational components.

In one embodiment, a method for protecting actuation of a computational component is provided. The method includes the steps of:

(a) retrieving, from first and second computational components, first and second unique identifiers respectively associated with the first and second computational components;

(b) accessing a license file to obtain third and fourth identifiers;

(c) comparing each of the first and second unique identifiers with the third and fourth identifiers;

(d) when both the first and second identifiers match respective ones of the third and fourth identifiers, permitting the first and second computational components to perform an operation; and (e) when both of the first and second identifiers do not match respective ones of the third and fourth identifiers, not permitting the first and second computational components to perform the operation.

The computational components can be any entity capable of performing a task or executing instructions, e.g., a logic-containing board or chip such as an application specific integrated circuit or ASIC, a (control) processor, software, etc. In one configuration, the computational components are duplicates of one another. For example, the computational components can be two processors one of which is a standby processor and the other of which is an active processor.

As will be appreciated, the relationship between the actuated computational component and identifier can take many forms. In one configuration, the computational component can be software, and the identifier can be associated with a hardware component configured to execute the software. For example, the first and second computational components are duplicated control processors and steps (d) and (e) determine whether another computational component, namely a software application, will be executed by one of the first and second computational components. In this configuration, the software itself is not directly assigned a unique identifier. For example, the identifier is a serial number(s) assigned to or associated with the control processor(s) configured to execute the software. In another example, the identifier is a serial number(s) assigned to a hardware component other than the executing control processor, such as a serial number of a media gateway processor where the control processor resides or a serial number of an IP services interface card in a port network. Alternatively, the identifier can be assigned directly to the actuated computational component itself.

The unique computational component identifier can be one or more numeric, alphabetical, or alphanumeric symbols. The identifier can have any format and have any length.

For example, the identifier can be a serial number assigned by a manufacturer, a Medium Access Control or MAC address, and the like.

The method and system of the present invention can have a number of advantages. First, the present invention can effectively protect and control actuation of one or more computational features, one or more controlled applications, and any other type or form of computational algorithm, in a duplicated processing environment. The use of a license file containing fields for multiple serial numbers can provide a high level of security of copy protection and feature activation. The license file marries the use of software to a specific instance of hardware. In this manner, the ability to create two simplex systems out of a single duplex system is substantially impeded. Second, the present invention can allow rapid, simple, and convenient generation of licenses for new systems and regeneration of licenses to accommodate repair situations. Third, the present invention can eliminate the ability of a service technician, or other authorized or unauthorized personnel, to alter directly the feature mix of a switch. That is, fewer people have the knowledge or access to "give away" software or features. Fourth, customers, dealers, and distributors can activate the computational component or features themselves without service personnel involvement. Fifth, the present invention can perform license verification rapidly, automatically and seamlessly for the user. These and other advantages will be apparent from the disclosure of the invention(s) contained herein.

The present application is related to U.S. patent application Ser. Nos. 10/232,906, entitled "REMOTE FEATURE ACTIVATOR FEATURE EXTRACTION" to Walker et al; 10/232,508, entitled "LICENSE MODES IN CALL PROCESSING" to Rhodes et al.; 10/232,507, entitled "LICENSE FILE SERIAL NUMBER TRACKING" to Serkowski et al.; 10/231,999, entitled "FLEXIBLE LICENSE FILE FEATURE CONTROLS" to Walker et al.; and 10/232,647, entitled "SOFTWARE LICENSING FOR SPARE PROCESSORS" to Walker et al, each of which is filed concurrently herewith and is incorporated herein by reference.

The above-described embodiments and configurations are neither complete nor exhaustive. As will be appreciated, other embodiments of the invention are possible utilizing, alone or in combination, one or more of the features set forth above or described in detail below.

DETAILED DESCRIPTION

Figure 1:
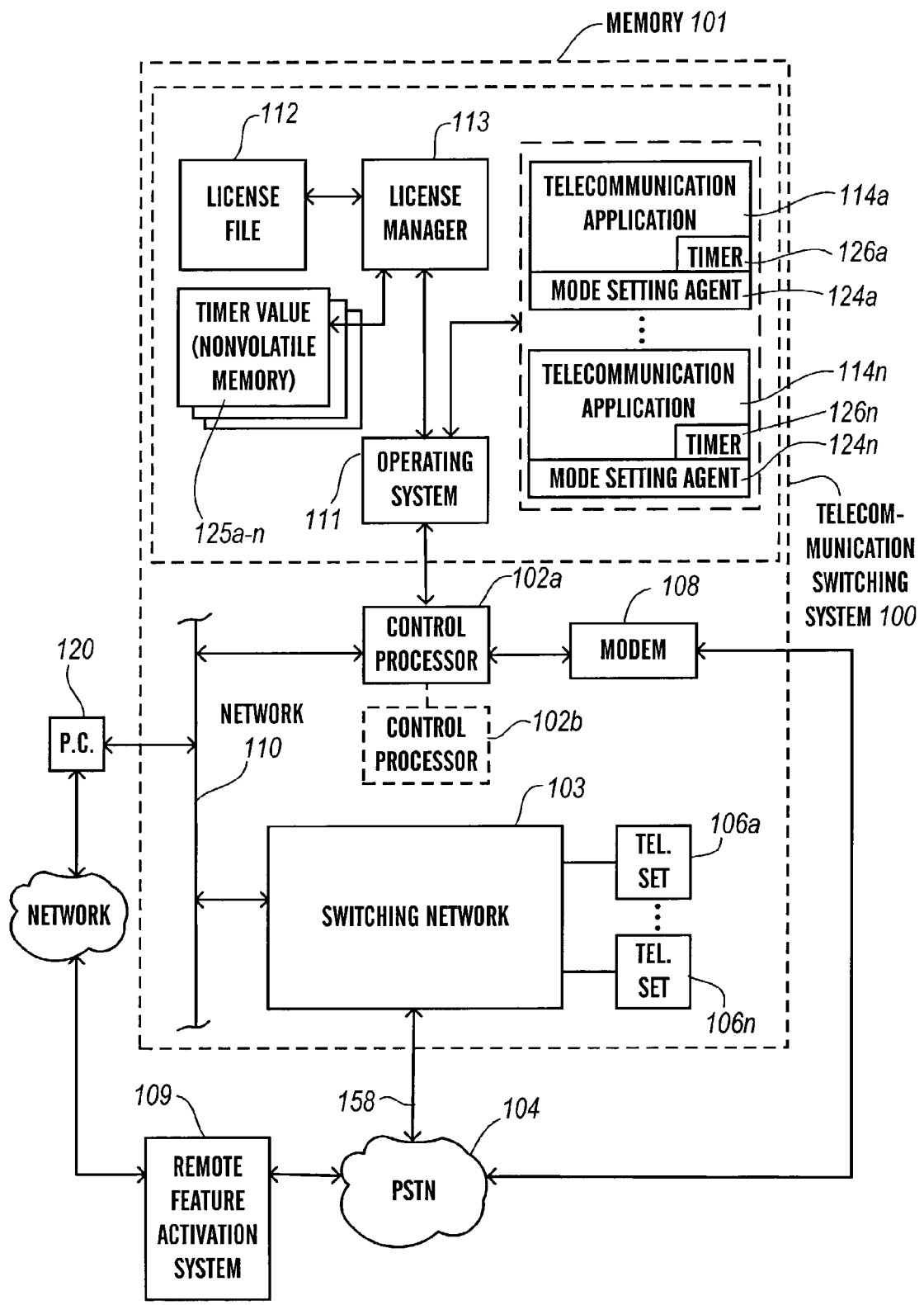
FIG. 1 depicts a telecommunication switching system according to an embodiment of the present invention.

FIG. 1 illustrates telecommunications switching system 100 interconnected to public telephone network 104. Telecommunications switching system 100 comprises telephone sets 106. The features and operations provided by telecommunication switching system 100 to telephones 106a–n and its interactions with public telephone network 104 are well known in the art. Illustratively, the switching system of FIG. 1 can be the subscriber-premises equipment disclosed in U.S. Pat. Nos. 6,192,122; 6,173,053; 6,163,607; 5,982,873; 5,905,793; 5,828,747; and 5,206,903, all of which are incorporated herein by this reference, or Avaya Inc.'s DEFINITY™ private-branch exchange (PBX)-based ACD system.

One of the duplex control processors 102a and 102b executes telecommunication applications 114a–n (each of which comprises a mode setting agent 124 and a timer 126) via operating system 111 to perform the telecommunication functions and features. Primary and backup control processors 102a and b execute instructions in memory 101, such as license manager 113 and telecommunication application 114a–n, and communicate with switching network 103 via network 110. One skilled in the art can readily envision that control processor(s) 102 can communicate with switching network 103 via a direct connection such as a connection via the processor bus of control processor(s) 102.

Operating system 111 is a conventional operating system allowing for the execution of applications such as telecommunication application 114a–n and for the intra-application communication of messages. Telecommunication application can be any licensed application(s) and/or feature(s) used in telecommunication systems, such as DEFINITY™ by Avaya, Inc.

Personal computer (PC) 120 is utilized by service personnel to administer telecommunication switching system 100.

Switching (or server) network 103 provides all of the necessary telecommunication switching and interfacing that is required in telecommunication switching system 100.

License manager 113 periodically verifies that the telecommunication switching system 100 is being operated in accordance with pertinent licensing rules and disables the system 100 or an operational part of the system 100 when licensing rules are violated (or a predetermined licensing event occurs). During initialization of the switch software, during the restoration of translations, and periodically as the switch is running, a query is made by the telecommunication application to the license manager 113. The license manager 113 reads license file 112, compares the serial number(s) in the license file 112 with a serial number in the switch hardware, compares the software name and/or version in the license with the name and/or version of the telecommunication application 114a–n or operational part thereof, and, if a match occurs, delivers permission to run the telecommunication application 114a–n or operational part thereof with the feature mask in the license file. The feature mask controls revenue associated options.

Figure 2:
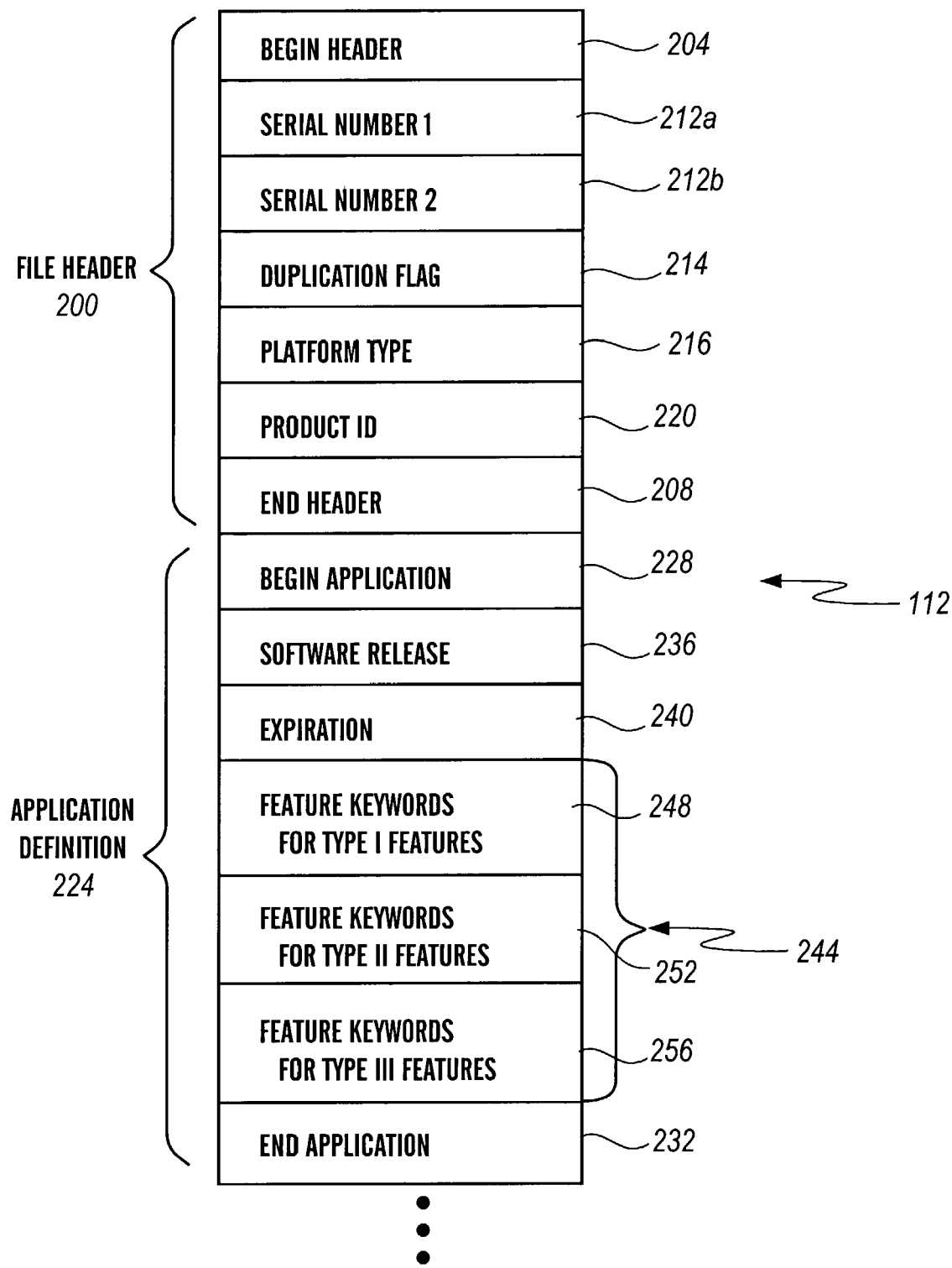
FIG. 2 depicts a license file according to another embodiment of the present invention.

Referring to FIGS. 1 and 2, the license file 112 includes a file header 200 which includes header beginning and ending fields 204 and 208 respectively, serial number fields 212a and b (each containing a serial number associated with one of control processors 102a and 102b), duplication flag field 214 (containing an indicator whether there is a duplicated control processor (or two serial numbers) in the system 100, e.g., a simplex or duplex configuration), a platform type field 216 (containing first platform information such as the product type and name and/or version of product that the license is for), and a product identifier or PID field 220 (containing second platform information different from the first platform information such as a product identifier used at the platform level for accessing Access Security Gateway or ASG keys) and one or more controlled application definitions 224 each of which includes controlled application beginning (which names the application, e.g., "DEFINITY"™ by Avaya, Inc.) and ending fields 228 and 232, respectively, a software release field 236 (identifying the software release version for which the license is granted), an expiration field 240 (expiration date of the license), and a feature mask 244 (providing information relating to the features to be enabled). The software application name is defined in the "Begin Application" field 228. In some applications, the duplication flag field 214 is contained in each application definition 224 and not in the file header 200.

In one configuration, the feature mask is configured as discussed in detail in copending U.S. patent application Ser. No. 10/231,999, entitled "Flexible License File Feature Controls" to Walker et al., filed concurrently herewith and incorporated herein by this reference. The content of the mask controls what features are enabled or maybe enabled on the product. There are three types of entries corresponding to fields 248, 252, and 256 in the feature mask.

The first type of entry (or Type I feature) in field 248 relates to those types of features that have a simple on/off state. The feature is either enabled or disabled. Each of these types of entries has two variables associated with it, namely a value and a lock. The value variable can be either on or off and the lock variable either locked or unlocked. Examples of features falling into this category include (in addition to those Type I features identified above in the background) Digital Communication System or DCS call coverage, audible message waiting, vectoring, attendant vectoring, Asynchronous Transfer Mode or ATM WAN spare processor, ATM, dial by name, echo cancellation, multimedia call handling, multiple call handling, caller identification, multifrequency signaling, Integrated Services Digital Network or ISDN network call redirection, centralized attendant, remote office, enhanced Direct Inward Dialing or DID routing, survivable remote processor, time of day routing, tenant partitioning, hospitality announcements, Vector Directory Number or VDN of origin announcement, wideband switching, and wireless.

The second type of entry (or Type II feature) in field 256 relates to those types of features that have a numeric value. The value can correspond to a numeric value and/or name kind of entry. Each of these types of entries has two values associated with it, namely a lower limit value and an upper limit value. The lower limit value is never greater than the upper limit value. Examples of features falling into this category include (in addition to those Type II features identified above in the background) logged-in automated call distribution or ACD agents, maximum currently registered IP stations, maximum administered IP trunks, offer category, maximum number of ports, maximum number of administered remote office trunks, and maximum number of mobile stations.

The third type of entry (or Type III feature) in field 256 relates to those types of features that have a product value (e.g., corresponding to a product name or type), a release number (e.g., referring to a product release identifier), and a numeric value (e.g., indicating an operational parameter associated with the product and/or release, such as how many ports are licensed, and/or how many licenses for the product are granted. This type of feature allows other controlled applications to be executed. Like the second type of entry, each of these types of entries has two values associated with it, namely a lower limit value and an upper limit value. The lower limit value is never greater than the upper limit value.

When duplicated processors are used such as shown in FIG. 1, a separate license file can be saved for each processor or a common license file for both processors. Because duplicated processors share translation, typically only one copy of the license file is installed, though the file is saved to two flash cards (one for each processor). If either of the two processors is replaced, the license file must be replaced.

Referring again to FIG. 1, a remote feature activation system 109 generates the license file that is transmitted to the switching system 100 upon installation or provisioning of the system. Remote feature activation system 109 is discussed in detail in copending U.S. application Ser. No. 10/232,507, entitled "License File Serial Number Tracking", to Serkowski et al., filed concurrently herewith and incorporated herein by this reference. Alternatively, the license file is installed by authorized personnel via PC 120.

Modem 108 is directly connected to control processor 102 so that control processor(s) 102 can contact remote feature activation system 109 via public telephone network 104. Similarly, remote feature activation system 109 can establish a communication channel with control processor 102 via public telephone network 104 and modem 108. One skilled in the art can readily envision that modem 108 can be interconnected to control processor(s) 102 via network 110.

Each telecommunication application 114$a$–$n$ can include a corresponding mode setting agent 124$a$–$n$ to set the licensing mode of the system 100. As discussed in copending U.S. application Ser. No. 10/232,508, entitled "Licensed Modes in Call Processing", to Rhodes et al., filed concurrently herewith and incorporated herein by this reference, the mode setting agent 124 can set one of three operational modes to the system 100.

In the LICENSE NORMAL mode, the license manager has found that a valid license is properly installed, the license file contains a serial number that matches the serial number of the processor (simplex configuration) or a plurality of serial numbers that match the serial numbers of a similar plurality of processors (multiple processor configuration (e.g., duplex configuration)), the software name and version of the telecommunication application matches that in the license file, the license has not expired, the offer category in the feature mask matches the translation, the feature usage in translation does not exceed limits in the feature mask (e.g., a feature limit is a capacity value associated with a type 2 or type 3 feature), and if the processor is a wide area network (WAN) spare processor or WSP, survivable remote spare processor or SRP, or local spare processor or LSP, the processor is not active.

In the LICENSE ERROR mode, the license manager has found one or more of the following: no valid license is properly installed, the license file contains a serial number that does not match the serial number of the processor (simplex configuration) or a plurality of serial numbers that do not match the serial numbers of a similar plurality of processors (multiple processor configuration (e.g., duplex configuration)), the license has expired, the feature usage exceeds limits (e.g., there are more ports translated than permitted by the port limit in the license life which can occur when translations are copied from another switch or when a new license file is installed that has lower limits than the previous license life) and the processor is a WSP, SRP, or LSP that is active. As discussed in copending U.S. patent application Ser. No. 10/231,999, entitled "Flexible License File Feature Controls", to Walker et al., filed concurrently herewith and incorporated herein by this reference, when there is a mismatch between the existing translation and the license file for a locked first type of entry the feature on/off state is simply updated to match the license and does not cause entry into LICENSE-ERROR mode. The LICENSE-ERROR mode is cleared by correcting the error that caused entry into the mode or by installing a valid license that is consistent with the configuration of the system 100. In the LICENSE-ERROR mode, the telecommunication application is permitted to run for a predetermined period of time or grace period. License error timer 126 (FIG. 1) and license timer value 125 are used to monitor the grace period.

In one configuration, all call processing functions of the telecommunication application are permitted to run during the LICENSE-ERROR MODE. Thus, the customer will realize the same level of service in both the LICENSE-NORMAL and LICENSE-ERROR modes.

In the NO-LICENSE mode, the license manager has found that (i) a license error timer 126a–n corresponding to an application is expired and one or more of the following: there is no valid license installed on the system, the feature usage exceeds limits, the license file contains a serial number that does not match the serial number of the processor (simplex configuration) or a plurality of serial numbers that do not match the serial numbers of a similar plurality of processors (multiple processor configuration (e.g., duplex configuration)), the license is expired, and the processor is a WSP, SRP, or LSP that is active; (ii) the name and/or version of the telecommunication application does not match the name and/or version in the license file; and/or (iii) the offer category in the feature mask does not match translation. In the NO-LICENSE mode, all new call originations (except alarm calls (e.g., 911 calls) and calls to an administered emergency number) are denied and all incoming calls (except calls to an administered number) are denied. This mode is cleared by correcting the error that caused entry into the mode or by installing a valid license that is consistent with the configuration of the switch.

Figure 3:
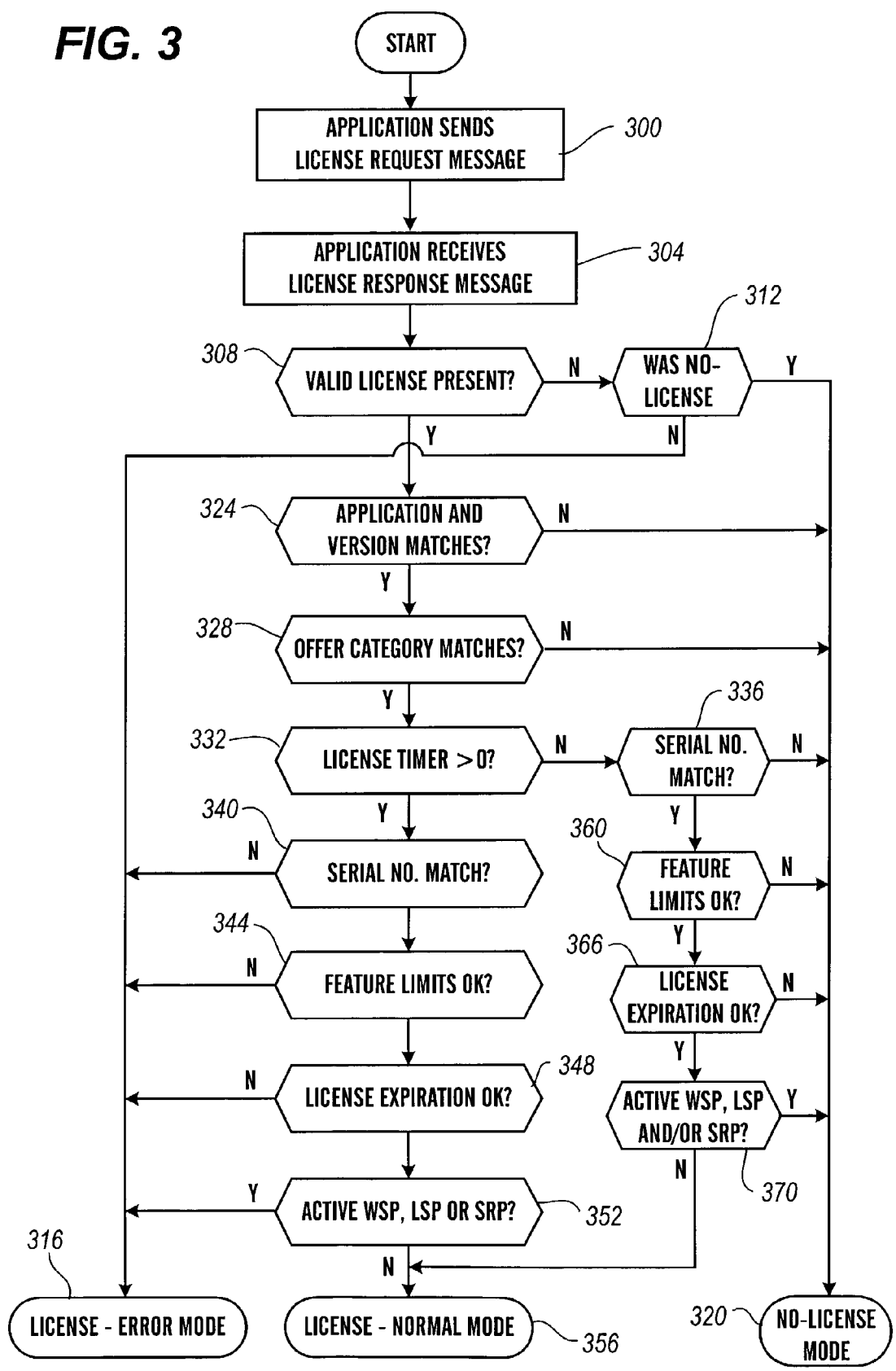
FIG. 3 is a flow chart depicting an algorithm of the telecommunication application according to yet another embodiment of the present invention.

The operation of the license manager 113 and mode setting agent 124 will now be discussed with reference to FIGS. 3 and 4. The process begins in step 300 of FIG. 3 when the mode setting agent 124 sends, such as at initialization of the application, periodically during execution of the application, or when a new license is installed, an encrypted message to the license manager 113 via operating system 111. The encrypted message includes a request for permission to run, a request for a list of permitted features, the name and version number for the telecommunication application 114 (making the request), and the date and time of the request. The request may also include a request for the value of the timer 124.

Figure 4A:
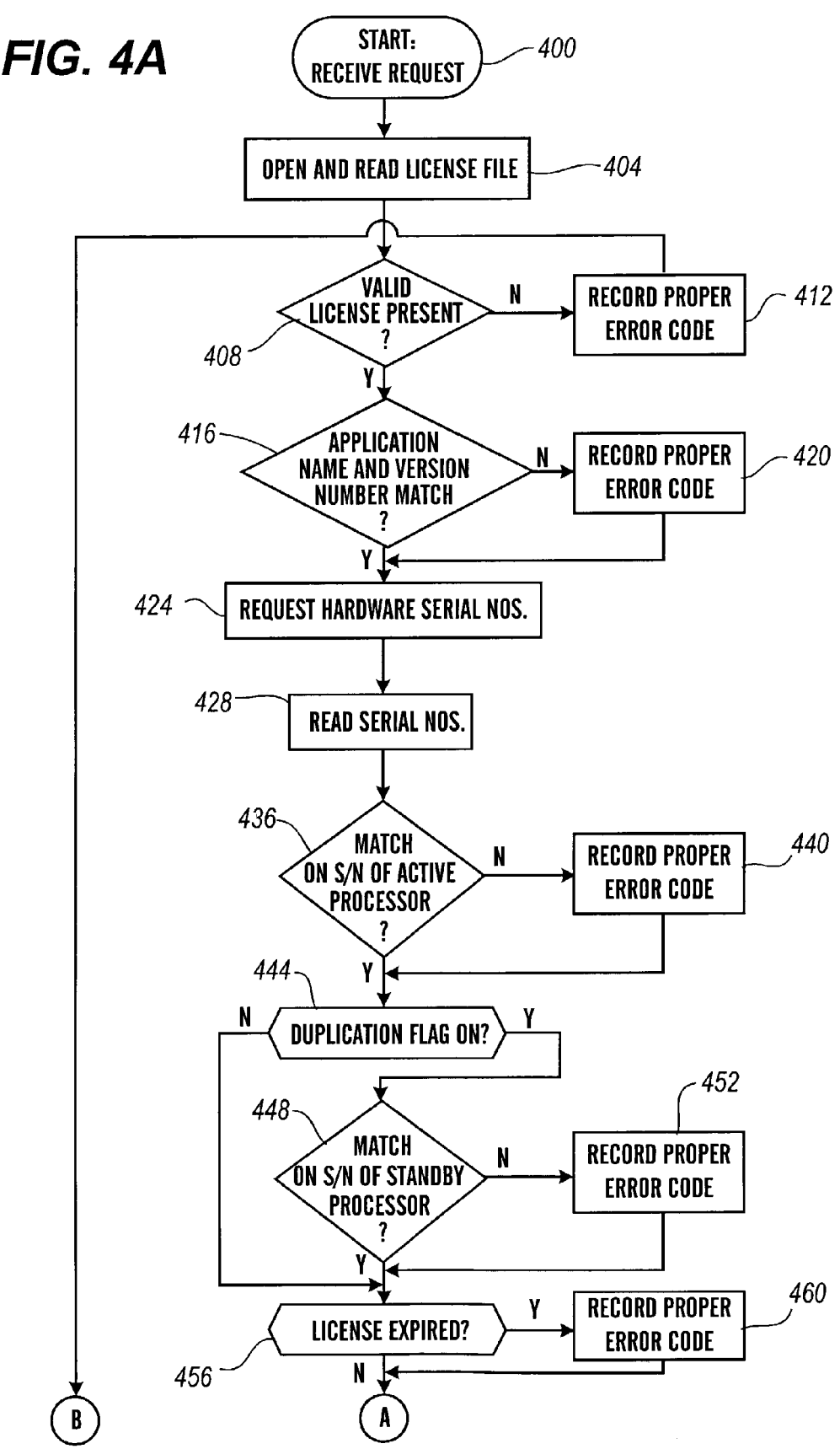
FIGS. 4A and 4B are flow charts depicting an algorithm of the license manager according to a further embodiment of the present invention.
Figure 4B:
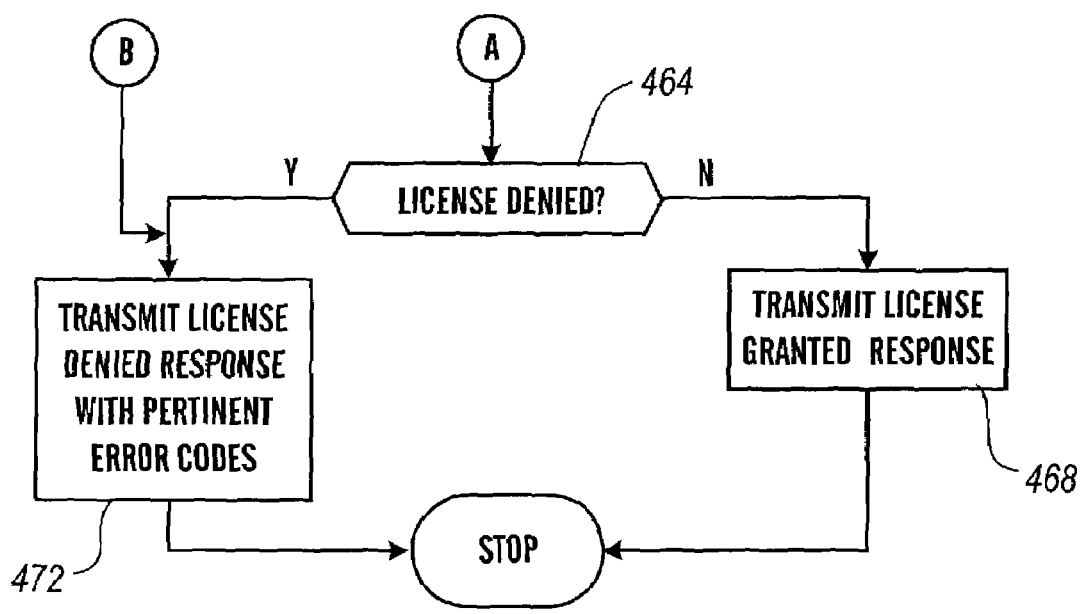

The request is received by the license manager 113 in step 400 of FIG. 4A. The license manager 113 decrypts the request and in response to the encrypted message attempts to open, decrypt, and read the license file 112 in step 404. In step 408, the license manager determines whether or not the license file is present and valid. This query determines whether there is a license file available, whether the license file is readable, and whether the license file is in the proper format. If any one of these checks has a negative result, the manager 113 concludes that the license file is invalid. When the license file is invalid, the manager 113 records in step 412 the error code corresponding to the fact of and/or reason for license file invalidity and proceeds to step 472 (discussed below).

In step 416, the manager 113 reads license file 112 to obtain the list of permitted features, name and/or version number of telecommunication application 114, and the serial number(s) of control processors 102a and 102b. For security reasons, the license file is stored in an encrypted form. As will be appreciated, the encryption can be performed using one or more keys. The manager 113 then determines whether or not the name and/or version number for the telecommunication application 114 matches the name and/or version number in the decrypted license file. If not, the manager 113 in step 420 records the error code corresponding to an unmatched name and/or version number.

In step 424, the manager 113 forwards a serial number request to each of the processors 102a and 102b. Control processors 102a and b each are assigned a unique electronically readable serial number that is set during board manufacture. If one or both of the processors 102 fails to respond to the serial number request after a predetermined time period and/or after a predetermined number of requests, manager 113 assumes that the processor 102 is unavailable. It is typically desired to resend serial number requests in the event that no response is received, as the processor may be resetting (e.g., after a firmware update) at the time of the initial serial number request.

In step 428, the manager 113 reads the serial number(s) of the hardware used for licensing (e.g. processor board serial number).

In step 436, the manager 113 determines if the serial number of the active processor could be read and if it matches either of the two serial numbers 212a and 212b in the license file. If the serial number of the active processor could not be read in step 428, or if it does not match any of the serial numbers in the license file, the manager 113 in step 440 records the proper error code for an unmatched serial number.

In step 444, the manager 113 determines whether the duplication flag is set or not. The duplication flag may be configured in any suitable manner, such as a bit having two values, 0 and 1, each of which indicates a different predetermined duplication state. For example, a "0" value indicates no duplication and a "1" value duplication. When the duplication flag is on, the manager 113 proceeds to step 448 and checks whether the standby processor serial number could be read in step 424 and if the serial number of the standby processor 102b matches either of the serial numbers in the license file. When the duplication flag is on, and the standby processor serial number could not be read or it does not match either of the serial numbers in the license file, the manager 113 in step 452 records the proper error code for an unmatched duplicated processor serial number.

In the event that the duplication flag is off or after either of steps 448 or 452, the manager 113 determines in step 456 whether or not the license is expired. When the expiration date in the license file is earlier than the current date and time, the license is considered to be expired. When the license is expired, the manager 113 in step 460 records the proper error code for an expired license.

In step 464, the manager 113 decides whether the license is to be denied or granted. The license is denied when one or more error codes is recorded during the preceding steps. The license is granted when no error codes are recorded.

When the license is granted, the manager 113 generates a license granted response in step 468. The response includes an indication that the license is granted and the feature mask of the license file. The message is encrypted and forwarded to the mode setting agent 124.

When the license is denied, the manager 113 generates a license denied response in step 472. The response includes an indication that the license is denied, the error code(s) corresponding to the reason(s) for license denial, and the feature mask. The feature mask is not returned if the error is "no valid license present" since there is no feature mask to return without a valid license. When the license is denied for more than one reason, error codes for all of the reasons for license denial are included in the license denial response. The message is encrypted and forwarded to the mode setting agent 124.

Referring again to FIG. 3, the mode setting agent 124 in step 304 receives the encrypted license response from the manager 113 and decrypts the response. As discussed below, the mode setting agent 124 parses through the various fields of the license response to set the license mode.

In step 308, the agent 124 determines whether the manager 113 found a valid license to be present. If a valid license is not present, the agent 124 determines in step 312 whether the current license mode of the system 100 is the NO-LICENSE mode. When the current mode is not the NO-LICENSE mode, the agent sets the mode to the LICENSE-ERROR mode in step 316. When the current mode is the NO-LICENSE mode, the agent leaves the system in the NO-LICENSE mode in step 320. If a valid license is present, the agent 124 proceeds to step 324.

In step 324, the agent determines whether the manager found that the application name and/or version matched the name and/or version in the license file. If not, the agent proceeds to step 320 in which the mode is set to the NO-LICENSE mode. If so, the agent proceeds to step 328.

In step 328, the agent determines whether the manager found that the offer category matches the translation. If not, the agent proceeds to step 320 in which the mode is set to the NO-LICENSE mode. If so, the agent proceeds to step 332.

In step 332, the agent determines whether the value of the corresponding license error timer $126a$–$n$ is greater than zero. The application 114 maintains the license error timer value in memory. When the license timer value is zero, the agent proceeds to step 336 (discussed below), and when the license timer value is greater than zero the agent proceeds to step 340 (also discussed below).

In one configuration, the value of the license error timer is periodically saved in nonvolatile memory of each of the processors so that the timer can be preserved across system resets. To make this possible, the mode setting agent makes not only a license file request but also a timer save request at predetermined intervals. The license timer value passed to the manager 113 for storage is set as follows: (a) if the system 100 is in LICENSE-NORMAL mode, the license timer value shall be the full duration of the grace period, e.g., 6 days, (b) if the system 100 is in LICENSE-ERROR mode, the license timer value $125a$–$n$ (each of which corresponds to a timer $126a$–$n$) saved shall be the time remaining on the corresponding license error timer $126a$–$n$, and (c) if the system 100 is in NO-LICENSE mode, the license timer value saved is zero.

At initialization or any other time that the value is not available in memory, the agent issues a timer request to the license manager 113. To generate a timer response, the manager 113 queries each of the processors for the stored timer value. The lowest of these values (the value closest to expiration) is passed back to the agent in the timer response message. If any of the timer values from the processors are corrupted or if no processor responds with a timer value, the value in the timer response message to the agent is zero (indicating that the timer is expired). The agent uses the timer value in the response to set the timer value in memory.

Returning to FIG. 3, the agent in step 340 determines whether or not the manager 113 found that the serial number(s) match. When the serial number(s) do not match, the agent proceeds to step 316 (in which the license mode is set to the LICENSE-ERROR mode). When the serial number(s) match, the agent proceeds to step 344.

The agent in step 344 next determines if the manager found that the feature limits were being exceeded. When the limits are being exceeded, the agent proceeds to step 316. When the limits are not being exceeded, the agent proceeds to step 348.

In step 348, the agent determines whether the manager found that the license is expired. When the license is expired, the agent proceeds to step 316. When the license is not expired, the agent proceeds to step 352.

The agent next checks in step 352 the feature mask to see if the processor is a WSP, LSP, or SRP. If it is, and the processor is active (i.e., not in standby mode), then the agent sets the license mode to LICENSE-ERROR in step 316. If it is not, the agent proceeds to step 356.

Returning again to step 336, the agent determines whether the manager found one or more unmatched serial numbers. If not, the agent proceeds to step 320 in which the license mode is set to the NO-LICENSE mode. If so, the agent proceeds to step 360.

If in either of steps 360 and 366, the agent determines that the manager found the feature limits to be exceeded or the license to be expired, respectively, the agent proceeds to step 320.

If in both of steps 360 and 366, the agent determines if the manager found that the feature limits are within licensed limits and the license is unexpired, respectively, the agent proceeds to step 370.

In step 370, the agent determines whether the processor is an active WSP, LSP, or SRP. If so, the agent proceeds to step 320. If not, the agent proceeds to step 356.

As shown by steps 336, 360, 366, and 370, the timer value $125a$–$n$ is relevant only if there is a license error. If there are no errors, the switch goes to LICENSE-NORMAL mode, even if the license error timer is expired. If this were not the case, there would be no way to get out of the NO-LICENSE mode once the timer had expired.

Whenever the system 100 enters the LICENSE-NORMAL mode, the agent clears any LICENSE-ERROR or NO-LICENSE alarms, stops the license error timer (if running) and resets the timer to the full duration of the grace period, and makes a timer save request of this duration to the license manager.

Whenever the system 100 enters the LICENSE-ERROR mode, the agent generates a major (license-error) alarm, logs the error into the system security log, and initiates the license error countdown timer.

Whenever the system 100 enters NO-LICENSE mode, the agent generates a major (no-license) alarm (that is different from the alarm generated by the agent on entry into the LICENSE-ERROR mode), logs the error into the system security log, and provides a timer save request of zero hours to the license manager.

When the system 100 is operating in the NO-LICENSE or LICENSE-ERROR mode, the alarm is presented to the user in a suitable mode or modes. For example, a suitable error message can be displayed on the initial login screen for the system and/or a key or other indicator can be illuminated on one or more telephone sets and/or on another part of the system hardware. The agent can also provide an alarm notification to outside service personnel.

A number of variations and modifications of the invention can be used. It would be possible to provide for some features of the invention without providing others.

For example in one alternative embodiment, the duplicated processors communicate with one another periodically (exchange serial numbers) in addition to, as part of, or in lieu of the periodic licensing verification analysis of the license manager 113.

In another alternative embodiment, the division of the various functions performed by the license manager and mode setting agent modules are different. For example, the license manager can perform all or part of the licensing-related functions of the mode setting agent or the mode setting agent can perform all or part of the licensing-related functions of the license manager.

In another alternative embodiment, the mode setting agent 124 is not a part of the telecommunication application 114.

In another alternative embodiment, the NO-LICENSE mode is entered in a stepwise fashion. First, no administrative changes would be permitted, then after a couple of days, displays would stop working, and then after a couple of more days outbound calls would be inhibited. This behavior would give the customer a better warning regarding the impending loss of service. While this does indeed tend to prod the customer who is simply not taking action when they could, it penalizes the customer that cannot take action because of availability of parts.

In yet another alternative embodiment, the license manager and/or mode setting agent 124 are implemented as software and/or hardware, such as a logic circuit, e.g., application specific integrated circuit.

In yet another alternative embodiment, any other applications running on the telecommunication switching system 100 can utilize the same mechanism as the mode setting agent 124 to determine if they are to be allowed to execute and what options they execute.

In yet a further alternative embodiment, the above techniques are applied with other telecommunication and/or non-telecommunication computational architectures having duplicated computational components. The computational components can be hardware, software, or a combination of the two.

In yet a further alternative embodiment, the license file can include fields for any number of unique identifiers for the same or differing types of hardware components. For example, for a license verification to be successful the license manager could require that there be matches for serial numbers not only of a control processor but also of an application specific integrated circuit or another type of hardware component.

In yet another embodiment, unsuccessful license verification causes only the contacting telecommunication application and not other successfully validated telecommunication applications or other parts of the system to be set to a mode other than the LICENSE NORMAL mode.

In yet another embodiment, when in LICENSE-NORMAL mode, if the mode setting agent does not receive a license response from a license manager within a predetermined time period of issuing a license request, the agent automatically enters the LICENSE-ERROR mode. When in the LICENSE-ERROR mode for reason other than failure to receive a license response, or at system initialization, if the agent does not receive a license response from the license manager within the predetermined period of issuing the license request, the system 100 shall enter NO-LICENSE mode.

In yet another embodiment, the sets of features enabled/disabled in the LICENSE-NORMAL and LICENSE-ERROR modes are different. The features that can be enabled and disabled in each mode comprise call routing or vectoring, to name but a few. In the LICENSE-NORMAL mode all of these features are enabled. In contrast, only some of these features are enabled in the LICENSE-ERROR mode.

In yet another embodiment, the present invention is used to enable/disable an application executed by a server in addition to or in lieu of a switch. This embodiment is particularly useful in monitoring licensing in multi-mode contact centers which receive a broad variety of contact types, such as telephone calls, electronic mail, and contacts via a Web browser.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. Although the description of the invention has included description of one or more embodiments and certain variations and modifications, other variations and modifications are within the scope of the invention, e.g. as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for protecting actuation of a computational component, comprising:
    (a) retrieving, from at least first and second computational components, at least first and second unique identifiers respectively associated with the at least first and second computational components, wherein the second computational component is a duplicate of the first computational component;
    (b) accessing a license file to obtain at least third and fourth identifiers;
    (c) comparing each of the at least first and second unique identifiers with at least one of the at least third and fourth identifiers;
    (d) when both the first and second identifiers matches a respective one of the third and fourth identifiers, permitting at least one of the at least first and second computational components to perform an operation; and
    (e) when both of the first and second identifiers do not match a respective one of the third and fourth identifiers, not permitting the at least one of the at least first and second computational components to perform an operation.

2. The method of claim 1, wherein the not permitting step is performed when one of the first and second identifiers matches one of the third and fourth identifiers and the other one of the first and second identifiers does not match one of the third and fourth identifiers and wherein in the not permitting step the at least one of the at least first and second computational components is permitted to execute a first set of instructions but not a second set of instructions.

3. The method of claim 1 further comprising:

(f) receiving a first message from a third computational component requesting permission to execute and/or continue execution and wherein the obtaining, accessing and comparing steps are performed in response to the first message, wherein the stimulus for generating the first message is at least one of initialization of the third computational component, restoration of translations by the third computational component, installation of a new license file, and periodically as the third computational component is being executed.

4. The method of claim 3, wherein the third computational component is one of a plurality of controlled applications, wherein the first message requests permission to continue execution and/or execute selected ones of a plurality of features that are to be provided by the one of the plurality of controlled applications, wherein the first and second computational components are respectively first and second processors and at least one of the first and second processors will execute the one of the plurality of controlled applications, and wherein the third and fourth identifiers are associated with the first and second processors.

5. The method of claim 4, wherein the license file comprises a plurality of controlled application definitions, each application definition corresponding to one of the plurality of controlled applications.

6. The method of claim 5, wherein each of the controlled application definitions comprises release information, license expiration information, and feature keyword information.

7. The method of claim 4, wherein the step of sending comprises the step of including a first version number of the one of the plurality of controlled applications in the first message, wherein the step of accessing comprises the step of reading a second version number from the license file of a set of the plurality of controlled applications that are allowed to execute on the at least one of the first and second processors defined by one of the first and second identifiers, wherein the step of comparing further compares the first version number with the second version number, and wherein the step of permitting further requires the first and second version numbers to match.

8. The method of claim 3, wherein the first and second computational components are processors, wherein the third computational component is a telecommunications application, and wherein each of the permitting and not permitting steps comprises sending a second message to the third computational component indicating whether or not the third computational component can execute.

9. The method of claim 1, wherein the license file comprises a duplication flag indicating whether or not the first computational component is duplicated by the second computational component, a platform type, and a platform identifier.

10. The method of claim 1, wherein the permitting step comprises the step of setting an operational mode of at least one of the at least first and second computational components to a license normal mode and wherein the not permitting step comprises the step of setting an operational mode of at least one of the at least first and second computational components to one of a license error mode and a no license mode.

11. The method of claim 10, wherein the not permitting step comprises the sub-steps of:

(e1) setting the operational mode of the at least one of the at least first and second computational components to the license error mode; and (e2) after a predetermined time, if the license error mode is not changed to the license-normal mode setting the operational mode of the at least one of the at least first and second computational components to the no-license mode.

12. The method of claim 1, further comprising:

(f) determining whether or not a duplication flag is set, the duplication flag indicating whether or not the first computational component is duplicated.

13. A computer readable medium storing instructions for performing the steps of claim 1.

14. The method of claim 1, wherein a third computational component requests permission to execute and wherein steps (c), (d), and (e) comprise the sub-steps:

determining if the first unique identifier matches at least one of the third and fourth identifiers;

when the first unique identifier fails to match at least one of the third and fourth identifiers, not permitting the third computational component to execute after a predetermined period of time;

determining a value of a duplication flag;

when the duplication flag has a first value and when the first unique identifier matches at least one of the third and fourth identifiers, determining if the second unique identifier matches at least one of the third and fourth identifiers;

when the second unique identifier fails to match at least one of the third and fourth identifiers, not permitting the third computational component to execute after a predetermined period of time; and when the first and second unique identifiers each match a respective one of the third and fourth identifiers, permitting the third computational component to execute longer than the predetermined period of time.

15. The method of claim 14, wherein, when the first and second unique identifiers each match a respective one of the third and fourth identifiers and when the second computational component is active, the third computational component is not permitted to execute after a predetermined period of time and, when the first and second unique identifiers each match a respective one of the third and fourth identifiers and when the first computational component is active, the third computational component is permitted to execute longer than the predetermined time period of time.

16. The method of claim 1, wherein the second computational component is designed to be on standby, wherein, when the second computational component is active and the first computational component is inactive and each of the first and second identifiers matches a respective one of the third and fourth identifiers, not permitting the second computational component to perform an operation, and wherein, when the first computational component is active and the second computational component is on standby and each of the first and second identifiers matches a respective one of the third and fourth identifiers, permitting the first computational component to perform an operation.

17. A system for protecting actuation of a computational component, comprising:

a processor;

at least first and second computational components having, respectively, at least first and second unique identifiers, wherein the second computational component is a duplicate of the first computational component;

a license file comprising at least third and fourth identifiers;

a license manager operable within a telecommunications switching system to retrieve, from the at least first and second computational components, the at least first and second unique identifiers, access the license file to obtain the at least third and fourth identifiers, compare each of the at least first and second identifiers with at least one of the at least third and fourth identifiers; and a mode setting agent operable within the telecommunications switching system to permit at least one of the at least first and second computational components to perform an operation, when both the first and second identifiers match a respective one of the third and fourth identifiers, and not permit the at least one of the at least first and second computational components to perform the operation, when both of the first and second identifiers do not match a respective one of the third and fourth identifiers.

18. The system of claim 17, wherein the mode setting agent does not permit the at least one of the first and second computational components to perform the operation when one of the first and second identifiers matches one of the third and fourth identifiers and the other one of the first and second identifiers does not match one of the third and fourth identifiers and permits the at least one of the at least first and second computational components to execute a first set of instructions but not a second set of instructions.

19. The system of claim 17, further comprising:
an input operable to receive a first message from the mode setting agent requesting permission to execute and/or continue execution and wherein the license manager performs the obtaining, accessing and comparing steps are preformed in response to the first message, wherein the first message is generated by the third computational component during initialization of the third computational component, restoration of translations by the third computational component, installation of a new license file, and periodically as the third computational component is running.

20. The system of claim 19, wherein the operation is associated with a plurality of controlled applications, wherein the first message requests permission to continue execution and/or execute identified ones of a plurality of features that are to be provided by the one of the plurality of controlled applications, wherein the first and second computational components are respectively first and second processors and at least one of the first and second processors will execute the one of the plurality of controlled applications, and wherein the third and fourth identifiers are associated with the first and second processors.

21. The system of claim 20, wherein the license file comprises a plurality of controlled application definitions, each controlled application definition corresponding to one of the plurality of controlled applications.

22. The system of claim 21, wherein each of the application definitions comprises software name and/or release information, license expiration information, and one or more types feature keyword information.

23. The system of claim 20, wherein the first message includes a first version number of the one of the plurality of controlled applications, wherein the license manager is operable to read a second version number from the license file of a set of the plurality of controlled applications that are allowed to execute on the at least one of the first and second processors defined by one of the first and second identifiers, wherein the license manager is operable to compare the first version number with the second version number, and wherein the license manager further requires the first and second version numbers to match to permit the at least one of the at least first and second computational components to perform the operation.

24. The system of claim 19, wherein the first and second computational components are processors, wherein the third computational component is a telecommunications application, and wherein the license manager sends a second message to the mode setting agent indicating whether or not the operation can be performed.

25. The system of claim 17, wherein the license file comprises a duplication flag indicating whether or not the first computational component is duplicated by the second computational component, a platform type, and a platform identifier.

26. The system of claim 17, wherein the mode setting agent is operable to set a first operation of at least one of the at least first and second computational components to a license normal mode and set a different, second operation of at least one of the at least first and second computational components to one of a license error mode and a license-error mode.

27. The system of claim 17, wherein the mode setting agent is operable to set an operational mode of the at least one of the at least first and second computational components to the license-error mode and, after a predetermined time if the license-error mode is not changed to a license-normal mode, set the operational mode of the at least one of the at least first and second computational components to a no-license mode and wherein a common set of call processing functions are enabled in the license-normal and license-error modes and wherein at least some of the call processing functions in the set of call processing functions are disabled in the no-license mode.

28. The system of claim 17, wherein the license manager is operable to determine whether or not a duplication flag is set, the duplication flag indicating whether or not the first computational component is duplicated by the second computational component.

29. The system of claim 17, wherein a third computational component requests permission to execute, wherein the license manager determines if the first unique identifier matches at least one of the third and fourth identifiers and, when the first unique identifier fails to match at least one of the third and fourth identifiers, the mode setting agent does not permit the third computational component to execute after a predetermined period of time; wherein the license manager determines a value of a duplication flag and, when the duplication flag has a first value and when the first unique identifier matches at least one of the third and fourth identifiers, determines if the second unique identifier matches at least one of the third and fourth identifiers, and, when the second unique identifier fails to match at least one of the third and fourth identifiers, the mode setting agent does not permit the third computational component to execute after a predetermined period of time; and wherein, when the first and second unique identifiers each match a respective one of the third and fourth identifiers, the mode setting agent permits the third computational component to execute longer than the predetermined period of time.

30. The system of claim 29, wherein, when the first and second unique identifiers each match a respective one of the third and fourth identifiers and when the second computational component is active, the mode setting agent does not permit the third computational component to execute after a predetermined period of time and wherein, when the first and second unique identifiers each match a respective one of the third and fourth identifiers and when the first computational component is active, the mode setting agent permits the third computational component to execute longer than the predetermined time period of time.

31. The system of claim 17, wherein the second computational component is designed to be on standby, wherein, when the second computational component is active and the first computational component is inactive and each of the first and second identifiers matches a respective one of the third and fourth identifiers, the mode setting agent does not permit the second computational component to perform an operation, and wherein, when the first computational component is active and the second computational component is on standby and each of the first and second identifiers matches a respective one of the third and fourth identifiers, the mode setting agent does not permit the first computational component to perform an operation.

32. A computer readable medium in a computer system executable on a processor, comprising:
  a license file for use in controlling activation of a computational component, the license file including:
  first and second unique identifiers, each corresponding to a respective identifier of first and second computational components, the second component being a duplicate of the first component and
  a duplication flag indicating that the second computational component is a duplicate of the first computational component; and
  a license manager operable within a telecommunications switching system to access the license file to obtain the first and second identifiers, compare each of the first and second identifiers with the respective identifier received from the corresponding one of the first and second computational components; and
  a mode setting agent operable within the telecommunications switching system to permit the at least one of the first and second computational components to perform an operation, when both the first and second computational components match a respective one of the retrieved identifiers, and not permit the at least one of the first and second computational components to perform the operation when both of the first and second identifiers do not match a respective one of the retrieved identifiers.

33. The medium of claim 32, wherein the first and second computational components are processors.

34. The medium of claim 33, further comprising at least one application definition comprising expiration information relating to expiration of a license associated with the license file, release information, and feature keyword information.

35. The medium claim 34, further comprising platform-type information and a platform identifier.

36. A method, comprising:
  (a) receiving from a third computational component a request for permission to execute and/or continue execution;
  (b) in response, retrieving from at least first and second computational components, at least first and second unique identifiers, respectively, associated with the at least first and second computational components, the second component being a duplicate of the first component;
  (c) accessing a license file to obtain at least third and fourth identifiers;
  (d) determining whether the first unique identifier matches at least one of the third and fourth identifiers;
  (e) when the first unique identifier fails to match at least one of the third and fourth identifiers, not permitting the third computational component to execute after a predetermined period of time;
  (f) determining a value of a duplication flag;
  (g) when the duplication flag has a first value and when the first unique identifier matches at least one of the third and fourth identifiers, determining whether the second unique identifier matches at least one of the third and fourth identifiers;
  (h) when the second unique identifier fails to match at least one of the third and fourth identifiers, not permitting the third computational component to execute after a predetermined period of time; and
  (i) when the first and second unique identifiers each match a respective one of the third and fourth identifiers, permitting the third computational component to execute longer than the predetermined period of time.

37. The method of claim 36, wherein, when the first and second unique identifiers each match a respective one of the third and fourth identifiers and when the second computational component is active, the third computational component is not permitted to execute after a predetermined period of time and, when the first and second unique identifiers each match a respective one of the third and fourth identifiers and when the first computational component is active, the third computational component is permitted to execute longer than the predetermined time period of time.

38. The method of claim 37, wherein the third computational component is one of a plurality of controlled applications, wherein the first message requests permission to continue execution and/or execute identification of ones of a plurality of features that are to be provided by the one of the plurality of controlled applications, wherein the first and second computational components are respectively first and second processors and at least one of the first and second processors will execute the one of the plurality of controlled applications, and wherein the third and fourth identifiers are associated with the first and second processors.

39. The method of claim 38, wherein the license file comprises a plurality of controlled application definitions, each application definition corresponding to one of the plurality of controlled applications.

40. The method of claim 39, wherein each of the controlled application definitions comprises release information, license expiration information, and one or more types feature keyword information.

41. The method of claim 36, wherein the second computational component is designed to be on standby, wherein, when the second computational component is active and the first computational component is inactive and each of the first and second identifiers matches a respective one of the third and fourth identifiers, not permitting the third computational component to execute after the predetermined period of time, and wherein, when the first computational component is active and the second computational component is on standby and each of the first and second identifiers matches a respective one of the third and fourth identifiers, permitting the third computational component to execute longer than the predetermined period of time.

* * * * *